(12) United States Patent
Weh et al.

(10) Patent No.: US 10,150,459 B2
(45) Date of Patent: Dec. 11, 2018

(54) PISTON ASSEMBLY FOR A PRESSURE-GENERATING DEVICE OF A BRAKING SYSTEM OF A MOTOR VEHICLE

(71) Applicant: Robert Bosch GmbH, Stuttgart (DE)

(72) Inventors: Andreas Weh, Sulzberg (DE); Matthias Mayr, Rettenberg (DE); Juergen Tandler, Fuessen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/529,107

(22) PCT Filed: Oct. 19, 2015

(86) PCT No.: PCT/EP2015/074140
§ 371 (c)(1),
(2) Date: May 24, 2017

(87) PCT Pub. No.: WO2016/091437
PCT Pub. Date: Jun. 16, 2016

(65) Prior Publication Data
US 2017/0259799 A1   Sep. 14, 2017

(30) Foreign Application Priority Data

Dec. 11, 2014   (DE) .................. 10 2014 225 590

(51) Int. Cl.
*B60T 17/02* (2006.01)
*B60T 13/02* (2006.01)
(Continued)

(52) U.S. Cl.
CPC ............ *B60T 17/02* (2013.01); *B60T 13/168* (2013.01); *F04B 9/02* (2013.01); *F04B 17/03* (2013.01)

(58) Field of Classification Search
CPC .......... F16D 55/08; F16D 55/30; F16D 65/18; F16D 2121/14; F16D 2125/40; B60T 13/02; B60T 13/16; B60T 13/168; B60T 17/02
(Continued)

(56) References Cited

U.S. PATENT DOCUMENTS 6,079,797 A    6/2000 Ganzel
6,367,592 B1 * 4/2002 Kapaan ................... F16D 65/18
                                                          188/158
(Continued)

FOREIGN PATENT DOCUMENTS

CN    101479472 A    7/2009
CN    102575730 A    7/2012
(Continued)

OTHER PUBLICATIONS

International Search Report dated Feb. 22, 2016, of the corresponding International Application PCT/EP2015/074140 filed Oct. 19, 2015.

*Primary Examiner* — Thomas J Williams
(74) *Attorney, Agent, or Firm* — Norton Rose Fulbright US LLP; Gerard Messina

(57) ABSTRACT

A piston assembly for a pressure-generating device of a braking system of a motor vehicle, including a piston, which is at least partially insertable into an opening formed in a hydraulic unit of the braking system and is axially displaceable therein, and including a ball screw for axially displacing the piston. The piston is connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion is larger than the second portion.

16 Claims, 8 Drawing Sheets

(51) Int. Cl.
*F04B 9/02* (2006.01)
*F04B 17/03* (2006.01)
*B60T 13/16* (2006.01)

(58) Field of Classification Search
USPC ........... 188/72.7, 72.8; 303/10, 116.4, 115.1, 303/115.4
See application file for complete search history.

(56) References Cited

U.S. PATENT DOCUMENTS

| | | | |
|---|---|---|---|
| 6,607,059 B1* | 8/2003 | Kapaan | F16D 65/18 188/72.8 |
| 6,691,837 B1* | 2/2004 | Kapaan | F16D 65/18 188/156 |
| 6,948,595 B2* | 9/2005 | Audren | F16D 65/18 188/71.9 |
| 2006/0169548 A1* | 8/2006 | Corbett | F16D 28/00 188/72.8 |
| 2012/0325597 A1 | 12/2012 | Giering et al. | |
| 2015/0322931 A1* | 11/2015 | Weh | B60T 8/4018 417/415 |

FOREIGN PATENT DOCUMENTS

| | | | |
|---|---|---|---|
| CN | 103221710 A | 7/2013 | |
| DE | 102008002740 A1 | 12/2009 | |
| JP | 2002257165 A | 9/2002 | |
| JP | 2005512000 A | 4/2005 | |
| JP | 2008030599 A | 2/2008 | |
| JP | 2012067888 A | 4/2012 | |
| WO | 2014026267 A1 | 2/2014 | |

* cited by examiner

PISTON ASSEMBLY FOR A PRESSURE-GENERATING DEVICE OF A BRAKING SYSTEM OF A MOTOR VEHICLE

FIELD

The present invention relates to a piston assembly for a pressure-generating device of a braking system of a motor vehicle. The present invention further relates to a pressure-generating device including the piston assembly according to the present invention. The present invention also relates to a hybrid unit for interacting with the pressure-generating device. The present invention further relates to a braking system for a motor vehicle. The present invention also relates to a method for installing the piston assembly for the pressure-generating device of the braking system of the motor vehicle.

BACKGROUND INFORMATION

Hydraulic vehicle braking systems conventionally include piston pumps for generating brake pressure.

German Patent Application No. DE 10 2008 002 740 A1 describes a piston pump, in particular for regulating brake pressure in a hydraulic vehicle braking system. The piston pump includes an outlet valve accommodated in a valve cover for controlling the flow of pressure medium. An outflow channel of the piston pump opens into a pressure medium channel of a pump housing. This pressure medium channel is situated above one end of the valve cover lying in the interior of the pump housing, as viewed in the direction of the longitudinal axis of the piston pump.

Furthermore, in order to generate pressure, a cylinder-piston system may be alternatively provided, in the case of which a drive unit is provided, which is designed for axially displacing the piston in an opening of a hydraulic unit provided therefor.

SUMMARY

The present invention provides a piston assembly for a pressure-generating device of a braking system of a motor vehicle, including a piston, which is at least partially insertable into an opening formed in a hydraulic unit of the braking system and is axially displaceable in the opening, and including a ball screw for axially displacing the piston, the ball screw including a nut, which may be set into a rotary motion with the aid of an electric motor via a gear, and including a spindle, the spindle being axially displaceable via the rotary motion of the nut and via a force transmission effectuated between the nut and the spindle in a circuit of rotating balls of the ball screw, the piston being connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion being larger than the second portion.

The present invention also provides a pressure-generating device including a piston assembly according to the present invention, and a flange, which is fastenable to the hydraulic unit of the braking system, and which, on a side facing the piston assembly, includes a hollow cylindrical projection, which is congruent with the opening of the hydraulic unit, in which the piston is at least partially axially displaceable with the aid of the ball screw.

The present invention also provides a hydraulic unit for interacting with a pressure-generating device, having an opening, which is formed in such a way that the piston of the pressure-generating device is at least partially axially displaceable in the opening with the aid of the ball screw.

The present invention also provides a braking system for a motor vehicle including the pressure-generating device according to the present invention and including the hydraulic unit according to the present invention for interacting with the pressure-generating device.

The present invention also provides a method for installing a piston assembly for a pressure-generating device of a braking system of a motor vehicle. The method includes connecting the piston to a spindle of a pre-installed ball screw. The method also includes fastening the piston, together with the ball screw, to a flange of the pressure-generating device, a projection formed on the piston being accommodatable in a recess formed in the flange in such a way that the piston is non-rotatably axially displaceable. The method also includes providing a bearing element for supporting the piston and the ball screw connected to the piston.

In accordance with an embodiment of the present invention, the ball screw is accommodated in the piston. As a result, a shortening of the box volume of the braking system may be achieved, with hydraulic-pressure generation with the aid of the piston, which extends through an electric motor of the pressure-generating device.

Advantageous specific embodiments and refinements are described herein with reference to the figures.

According to one preferred refinement, it is provided that a length of the nut is defined along a displacement axis of the axially displaceable piston, the first portion of the nut having at least 50% of the length of the nut, preferably at least 75% of the length of the nut, and the second portion of the nut having less than 50% of the length of the nut, preferably less than 25% of the length of the nut. As a result, a shortening of the box volume of the braking system by one stroke length of the piston may be advantageously achieved in the first position of the piston.

According to yet another preferred refinement, it is provided that the piston is connected to the spindle of the ball screw with the aid of a bolted connection and/or a welded connection. The piston may therefore be rotatably fixedly fastened to the spindle in a simple and reliable way.

According to yet another preferred embodiment, it is provided that the piston includes at least one projection on an outer circumferential surface, which is accommodatable in a recess formed in a flange and/or the hydraulic unit in such a way that the piston is non-rotatably axially displaceable. It may therefore be ensured that the piston does not rotate along with the nut of the ball screw.

According to yet another preferred refinement, it is provided that the hydraulic unit has at least one recess situated in the opening, which is designed for accommodating at least one projection formed on an outer circumferential surface of the piston in such a way that the piston is non-rotatably axially displaceable. It may therefore be ensured that the piston does not rotate along with the nut of the ball screw.

According to yet another preferred refinement, it is provided that the projection is formed by a pin-shaped element, which is form-lockingly connectable to the recess formed in the piston. It may therefore be ensured that the piston does not rotate along with the nut of the ball screw.

According to yet another preferred refinement, it is provided that a support element for preloading the piston and the ball screw connected to the piston is provided, the support element providing a stop face for the bearing element for supporting the piston and the ball screw connected to the piston. A compact pressure-generating device for the braking system of the motor vehicle may therefore be provided.

The described embodiments and refinements may be arbitrarily combined with each other.

Further possible embodiments, refinements and implementations of the present invention also include non-explicitly mentioned combinations of features of the present invention described above or in the following with respect to the exemplary embodiments.

BRIEF DESCRIPTION OF THE DRAWINGS

The figures are intended to provide a better understanding of the specific embodiments of the present invention. The figures illustrate specific embodiments and, in combination with the description, are used for describing principles of the present invention.

Other specific embodiments and many of the aforementioned advantages result with respect to the figures. The elements represented in the figures are not necessarily shown true to scale with respect to each other.

DETAILED DESCRIPTION OF EXAMPLE EMBODIMENTS

Figure 1:
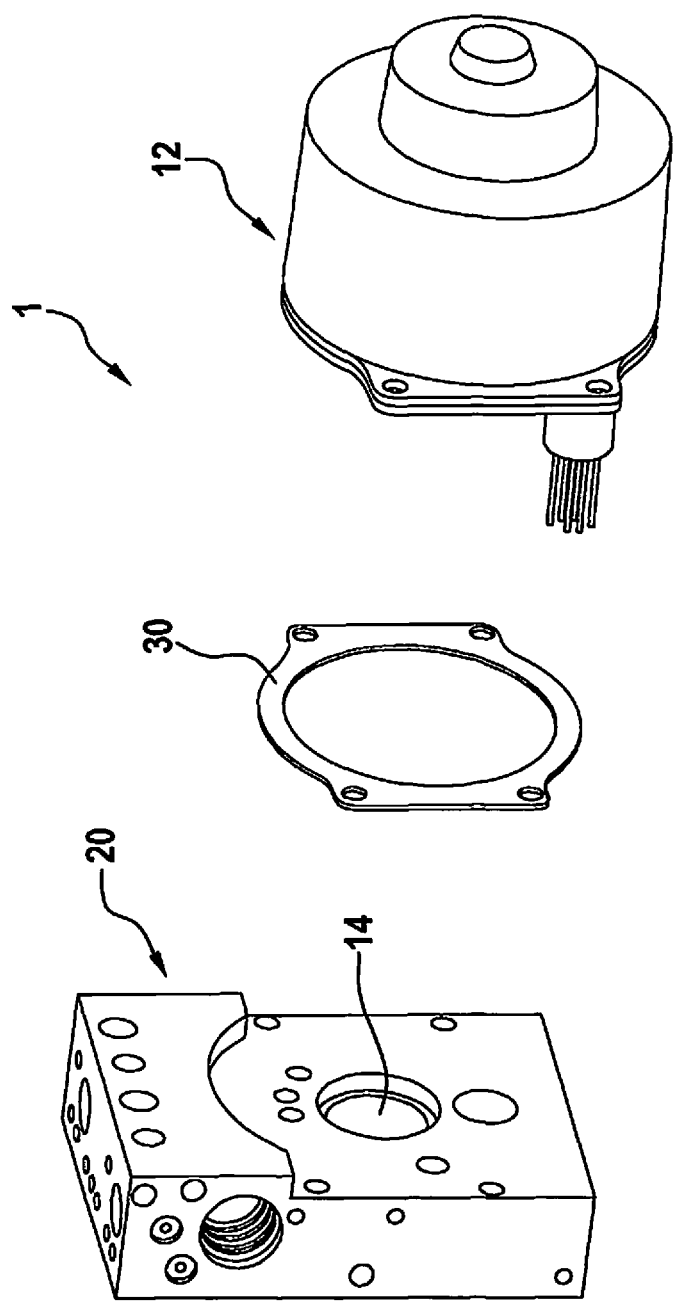
FIG. 1 shows one schematic representation of one portion of a braking system of a motor vehicle according to one preferred specific embodiment of the present invention.

In the figures, identical reference numerals label identical or functionally identical elements or components, unless indicated otherwise.

FIG. 1 shows one schematic representation of one portion of a braking system of a motor vehicle according to one preferred specific embodiment of the present invention.

Braking system 1 includes a pressure-generating device 12 and a hydraulic unit 20. Other components of braking system 1 are not described further, for the sake of simplicity. Pressure-generating device 12 is designed in such a way that it is fastenable to hydraulic unit 20. Hydraulic unit 20 has an opening 14, which is designed for accommodating a piston (not represented in FIG. 1) of pressure-generating device 12. In the installed state, a sealing element 30 for sealing the connection between pressure-generating device 12 and hydraulic unit 20 is situated between pressure-generating device 12 and hydraulic unit 20.

Figure 2:
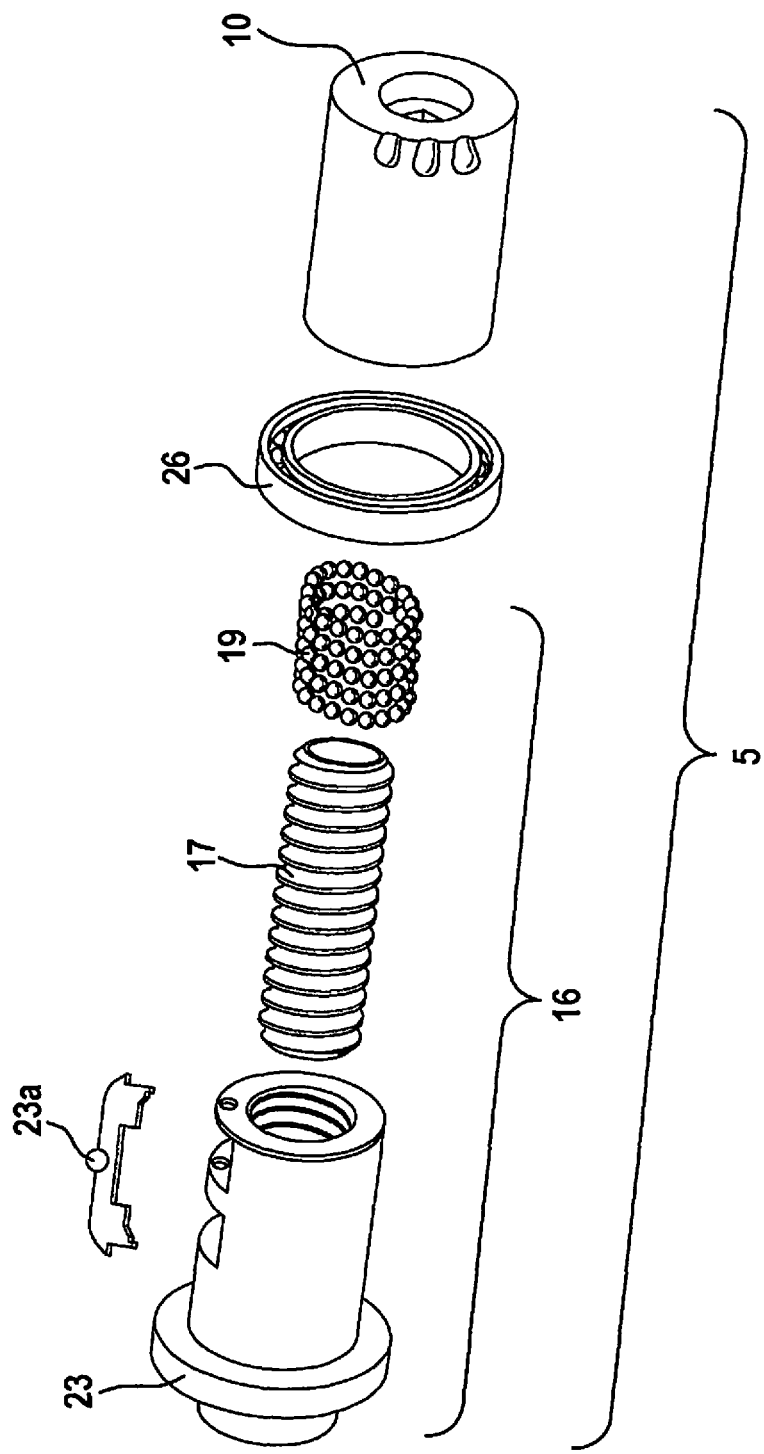
FIG. 2 shows one exploded representation of a piston assembly according to the preferred specific embodiment of the present invention.

FIG. 2 shows one exploded representation of a piston assembly according to the preferred specific embodiment of the present invention.

Piston assembly 5 includes piston 10, ball screw 16, and a bearing element 26. Piston 10 is preferably cylindrical. Alternatively, piston 10 may also have another suitable shape. Ball screw 16 includes a spindle 17, a plurality of balls 19, and a nut 23. In the installed state of the ball screw, balls 19 are situated between spindle 17 and nut 23 in such a way that a rotation of fixedly situated nut 23 effectuates a translational motion of spindle 17. Nut 23 also includes a deflection piece 23a. This deflection piece effectuates a redirection of the balls, so that a continuous axial displacement of spindle 17 relative to nut 23 is made possible.

Bearing element 26 supports piston 10 and spindle 17, which is connected to piston 10 in the installed state of pressure-generating device 12. Spindle 17 is advantageously connected to piston 10 via a bolted connection. For this purpose, a thread (not shown in FIG. 2), to which spindle 17 is connected via a corresponding thread, is formed on a narrow side of piston 10. Alternatively, spindle 17 may also be connected to piston 10, for example, via a welded connection.

Figure 3:
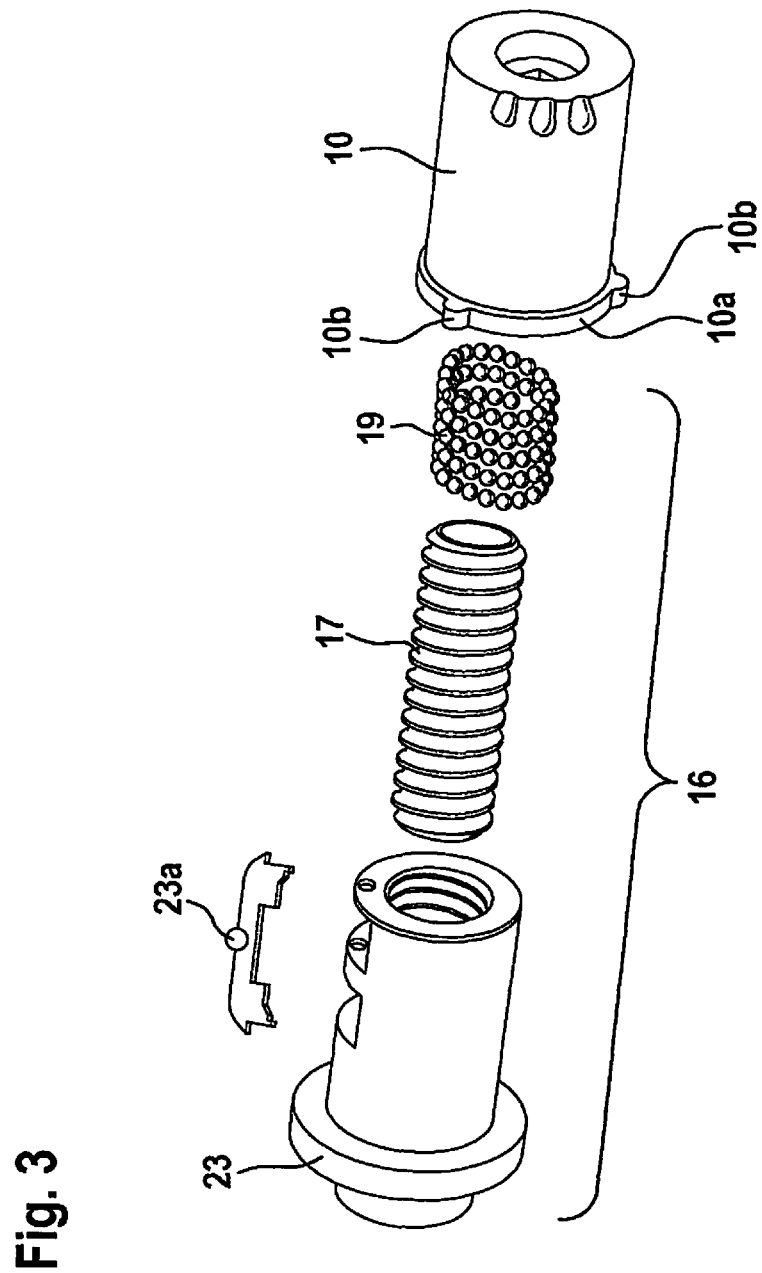
FIG. 3 shows one exploded representation of the piston assembly according to yet another preferred specific embodiment of the present invention.

FIG. 3 shows one exploded representation of the piston assembly according to yet another preferred specific embodiment of the present invention.

A projection 10b, specifically three projections 10b in the present exemplary embodiment, is preferably formed on an outer circumferential surface of piston 10. Projections 10b are situated on a collar 10a of piston 10. Collar 10a of piston 10 is used for stabilization against pressures which act on a lateral surface.

Upon an axial displacement of piston 10, projections 10b are accommodatable in a recess formed in a flange (not shown in FIG. 3) and/or a hydraulic unit (not shown in FIG. 3) in such a way that piston 10 is non-rotatably axially displaceable. Projections 10b therefore prevent the spindle and the piston connected thereto from also rotating as a result of a rotation of an electric motor of the pressure-generating device and, effectuated thereby, a rotation of the nut of the pressure-generating device.

Figure 4:
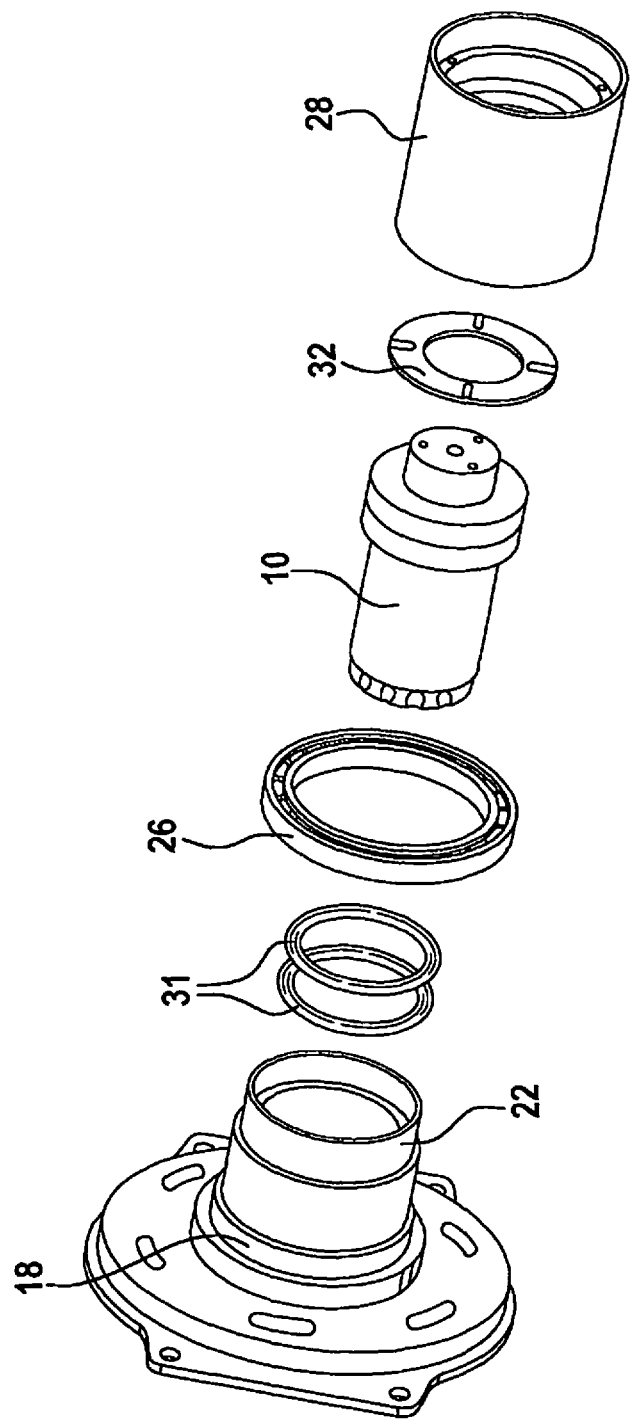
FIG. 4 shows one exploded representation of a pressure-generating device according to the preferred specific embodiment of the present invention.

FIG. 4 shows one exploded representation of a pressure-generating device according to the preferred specific embodiment of the present invention.

Piston 10 is represented in FIG. 4 having the ball screw situated therein. Flange 18 includes a hollow cylindrical projection 22, which is designed in such a way that piston 10, together with the ball screw integrated therein, is accommodatable in projection 22.

In addition, a large number of seals 31, bearing element 26, one further bearing element 32, and support element 28 are provided. In the installed state of pressure-generating device 12, sealing elements 31 surround piston 10 and are situated between piston 10 and hollow cylindrical projection 22 of flange 18. Bearing element 26 surrounds hollow cylindrical projection 22 of flange 18 and is therefore situated on an outer circumferential surface of hollow cylindrical projection 22 of flange 18. Further bearing element 32 is used for supporting piston 10. Support element 28 is used for preloading piston 10 and the ball screw connected to piston 10, support element 28 providing a stop face for bearing element 26 for supporting piston 10 and the ball screw connected to piston 10. Support element 28 is non-rotatably and captively fastened, so that the axial forces arising due to a pressure in a piston chamber of piston 10 may be absorbed. Support element 28 is connected to flange 18 via a screw. Alternatively, support element 28 may also be connected to flange 18 via a welded connection or another suitable connection.

Figure 5:
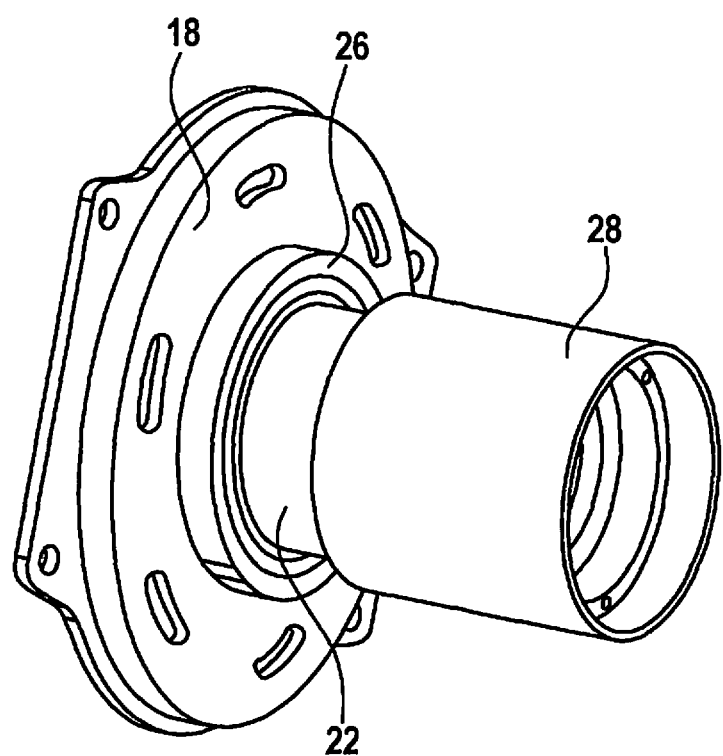
FIG. 5 shows one schematic representation of one portion of the pressure-generating device according to the preferred specific embodiment of the present invention.

FIG. 5 shows one schematic representation of one portion of the pressure-generating device according to the preferred specific embodiment of the present invention.

In FIG. 5, bearing element 26 and support element 28 have been mounted on hollow cylindrical projection 22 of flange 18. Hollow cylindrical projection 22 of flange 18 is preferably formed by a bore. Alternatively, hollow cylindrical projection 22 may also be produced in another way.

Figure 6:
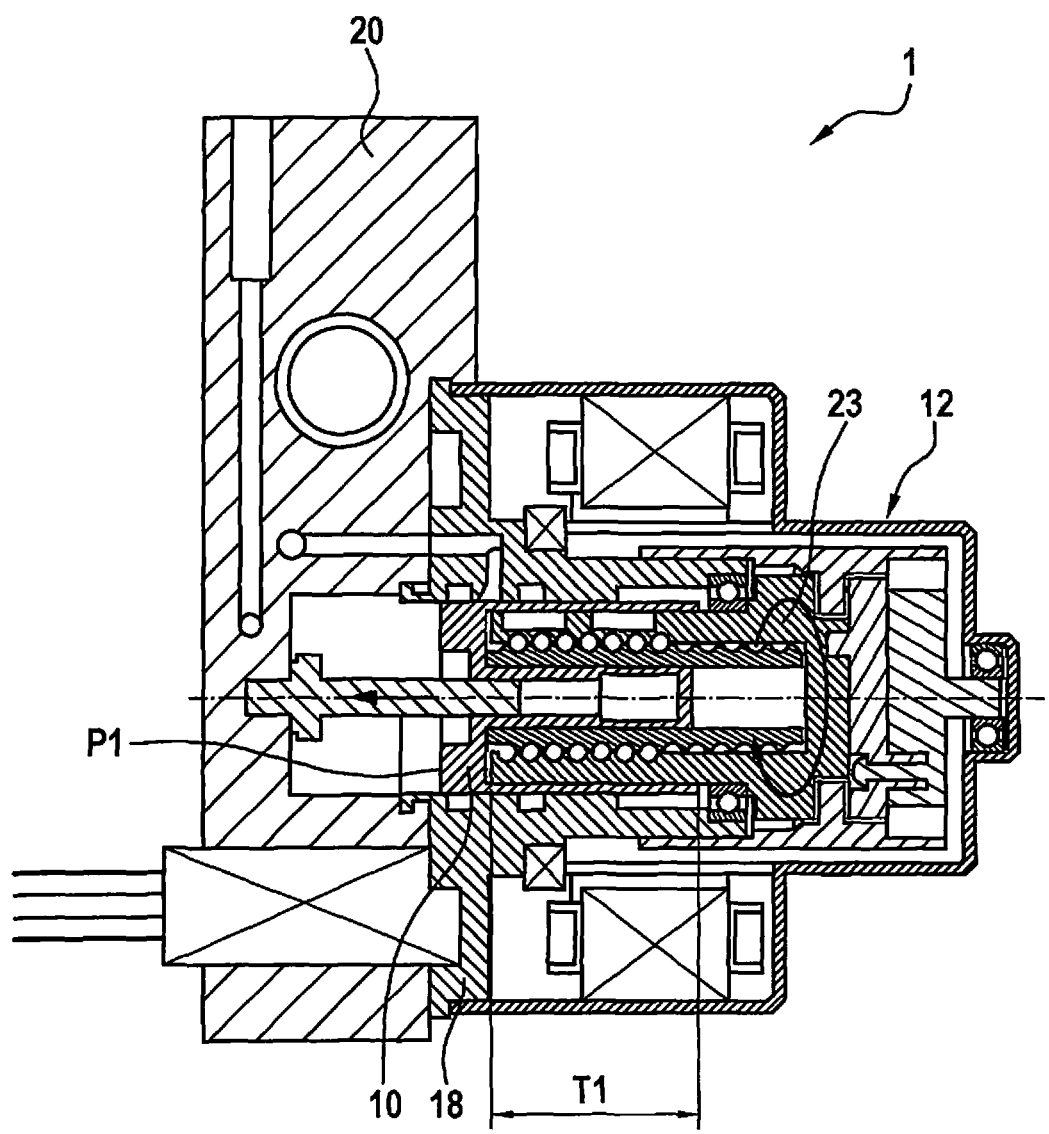
FIG. 6 shows one schematic representation of the braking system according to the preferred specific embodiment of the present invention.

FIG. 6 shows one schematic representation of the braking system according to the preferred specific embodiment of the present invention.

In the representation shown in FIG. 6, pressure-generating device 12 is mounted on hydraulic unit 20 with the aid of flange 18. Piston 10 is partially inserted into the opening formed in a hydraulic unit 20 of braking system 1 and is axially displaceable in the opening with the aid of the ball screw. The ball screw includes nut 23, which may be put into a rotary motion with the aid of an electric motor via the gear, and the spindle, the spindle being axially displaceable via the rotary motion of nut 23 and via a force transmission effectuated between nut 23 and the spindle in a circuit of rotating balls of the ball screw.

Piston 10 is connected to the axially displaceable spindle of the ball screw in such a way that piston 10 moves along with the axially displaceable spindle of the ball screw, piston 10 enclosing one first portion T1 of nut 23 in a first, retracted position P1 of piston 10 shown in FIG. 6. A length of nut 23 is defined along a displacement axis of axially displaceable piston 10. Preferably, first portion T1 of nut 23 has at least 50% of the length of nut 23. Alternatively, first portion T1 of nut 23 may also have at least 75% of the length of nut 23.

Figure 7:
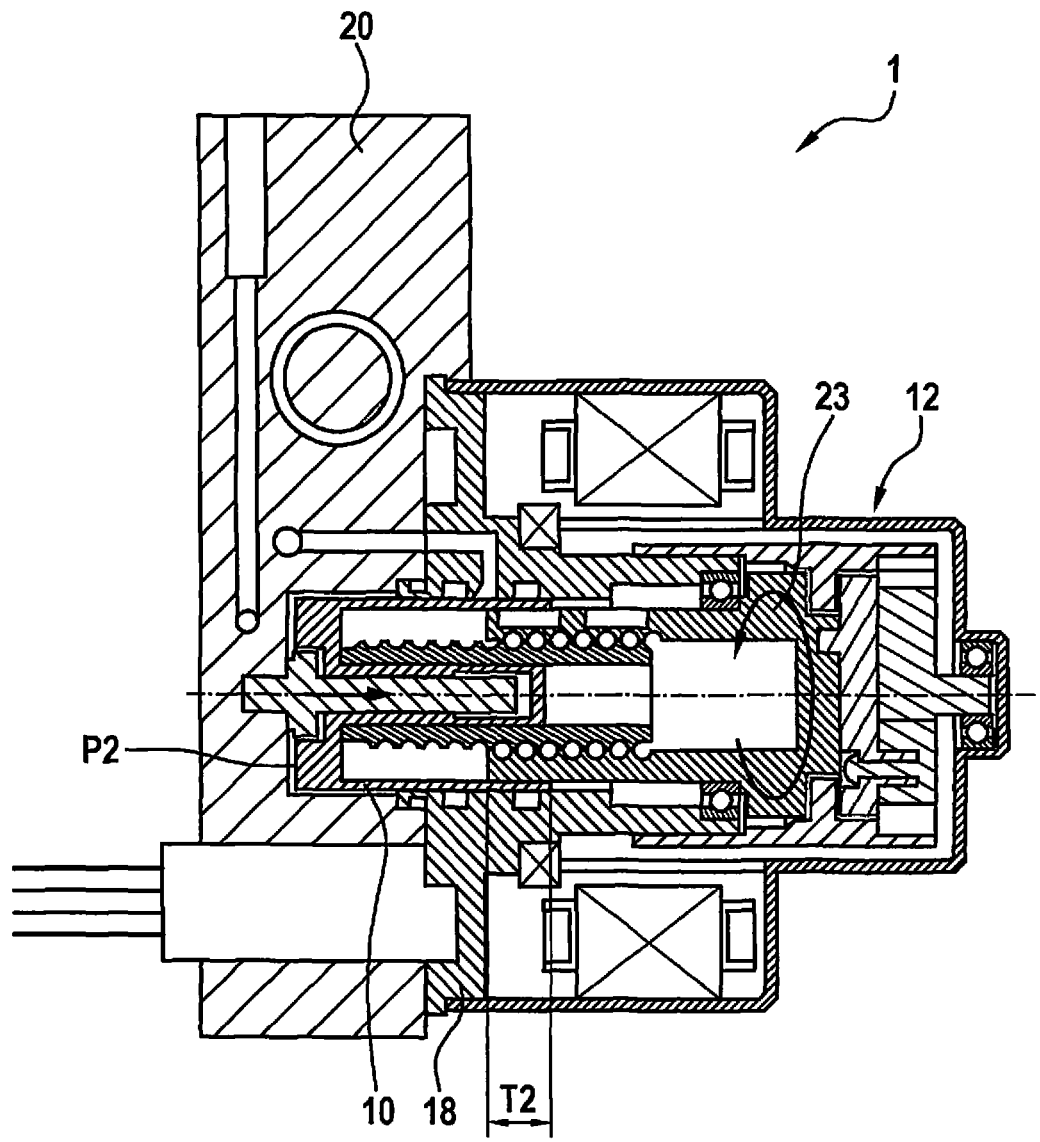
FIG. 7 shows one schematic representation of the braking system according to the preferred specific embodiment of the present invention.

FIG. 7 shows one schematic representation of the braking system according to the preferred specific embodiment of the present invention.

In the representation shown in FIG. 7, piston 10 is situated in a second, extended position P2, in which piston 10 encloses a second portion T2 of nut 23. First portion T1 of nut 23 is preferably larger than second portion T2 of nut 23. The length of nut 23 is defined along a displacement axis of axially displaceable piston 10. Preferably, second portion T2 of nut 23 has at most 50% of the length of nut 23. Alternatively, first portion T1 of nut 23 may also have at most 25% of the length of nut 23.

Figure 8:
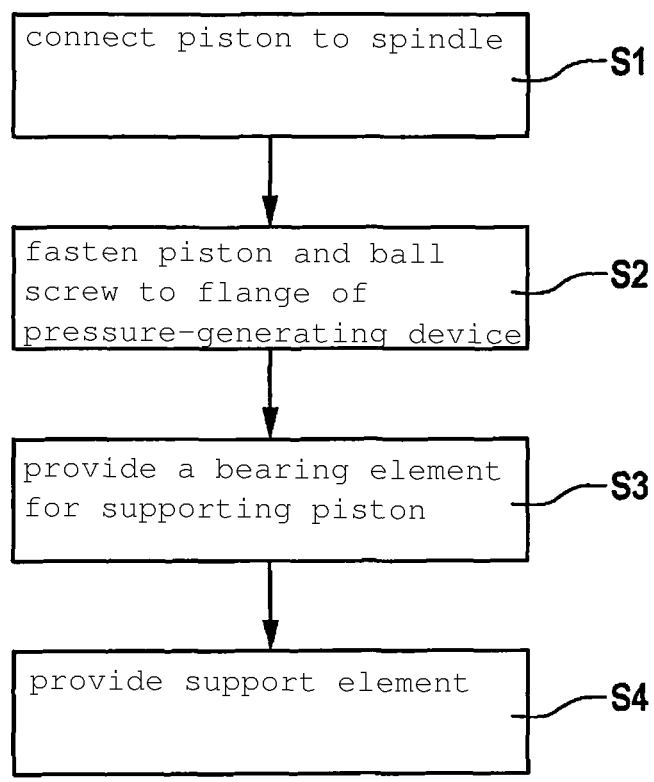
FIG. 8 shows a flow chart of a method for installing the pressure-generating device according to the preferred specific embodiment and the further preferred specific embodiment of the present invention.

FIG. 8 shows a flow chart of a method for installing the pressure-generating device according to the preferred specific embodiment and the further preferred specific embodiment of the present invention.

The method for installing the piston for the pressure-generating device of the braking system includes connecting S1 the piston to a spindle of a pre-installed ball screw. The method also includes fastening S2 the piston, together with the ball screw, to a flange of the pressure-generating device, a projection formed on the piston being accommodatable in a recess formed in the flange in such a way that an angular orientation of the piston with respect to the flange is fixed. The method also includes providing S3 a bearing element for supporting the piston and the ball screw connected to the piston. The method also includes providing S4 a support element for preloading the piston and the ball screw connected to the piston, the support element providing a stop surface for the bearing element for supporting the piston and the ball screw connected to the piston.

Although the present invention was described above on the basis of preferred exemplary embodiments, it is not limited thereto. Instead, the present invention is modifiable in various ways. In particular, the present invention may be changed or modified in various ways without departing from the scope of the present invention.

For example, the flange or the hollow cylindrical projection formed on the flange may also have another suitable shape, which is advantageously adapted to the piston. In addition, the guidance of the piston may also be provided in another way and with the aid of other suitable bearing elements.

What is claimed is:

1. A piston assembly for a pressure-generating device of a braking system of a motor vehicle, comprising:
 a piston which is at least partially insertable into an opening formed in a hydraulic unit of the braking system and is axially displaceable in the opening; and
 a ball screw for axially displacing the piston, the ball screw including a nut, which is configured to be set into a rotary motion with the aid of an electric motor via a gear, and including a spindle, the spindle being axially displaceable via the rotary motion of the nut and via a force transmission effectuated between the nut and the spindle in a circuit of balls of the ball screw, the piston being connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion being larger than the second portion;
 wherein:
 a length of the nut is defined along a displacement axis of the axially displaceable piston;
 the first portion of the nut includes at least 50% of the length of the nut; and
 the second portion of the nut includes less than 50% of the length of the nut.

2. The piston assembly as recited in claim 1, wherein the first portion of the nut includes at least 75% of the length of the nut, and the second portion of the nut includes less than 25% of the length of the nut.

3. The piston assembly as recited in claim 1, wherein the piston is connected to the spindle of the ball screw via at least one of a bolted connection and a welded connection.

4. The piston assembly as recited in claim 1, wherein the piston includes at least one projection on an outer circumferential surface, which is accommodatable in a recess formed in at least one of a flange and the hydraulic unit, in such a way that the piston is non-rotatably axially displaceable.

5. A pressure-generating device, including a piston assembly having a piston which is at least partially insertable into an opening formed in a hydraulic unit of the braking system and is axially displaceable in the opening, and a ball screw for axially displacing the piston, the ball screw including a nut, which is configured to be set into a rotary motion with the aid of an electric motor via a gear, and including a spindle, the spindle being axially displaceable via the rotary motion of the nut and via a force transmission effectuated between the nut and the spindle in a circuit of balls of the ball screw, the piston being connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion being larger than the second portion, and including a flange which is fastenable to the hydraulic unit of the braking system, and which, on a side facing the piston assembly, includes a hollow cylindrical projection that is congruent with the opening of the hydraulic unit, in which the piston is at least partially axially displaceable with the aid of the ball screw;
wherein:
a length of the nut is defined along a displacement axis of the axially displaceable piston;
the first portion of the nut includes at least 50% of the length of the nut and
the second portion of the nut includes less than 50% of the length of the nut.

6. The pressure-generating device as recited in claim 5, wherein the first portion of the nut includes at least 75% of the length of the nut, and the second portion of the nut includes less than 25% of the length of the nut.

7. The pressure-generating device as recited in claim 5, wherein the piston is connected to the spindle of the ball screw via at least one of a bolted connection and a welded connection.

8. The pressure-generating device as recited in claim 7, wherein the piston includes at least one projection on an outer circumferential surface, which is accommodatable in a recess formed in at least one of a flange and the hydraulic unit, in such a way that the piston is non-rotatably axially displaceable.

9. The pressure-generating device as recited in claim 5, further comprising:
a bearing element that surrounds the hollow cylindrical projection of the flange; and
a support element that houses the nut and at least a portion of the spindle and the piston and that forms a stop face for the bearing element.

10. The pressure-generating device as recited in claim 5, further comprising at least one sealing ring circumferentially surrounded by an interior of the hollow cylindrical projection of the flange and circumferentially surrounding an exterior of the piston.

11. A hydraulic unit for interacting with a pressure-generating device having pressure-generating device, the pressure generating device including a piston assembly having a piston which is at least partially insertable into an opening formed in a hydraulic unit of the braking system and is axially displaceable in the opening, and a ball screw for axially displacing the piston, the ball screw including a nut, which is configured to be set into a rotary motion with the aid of an electric motor via a gear, and including a spindle, the spindle being axially displaceable via the rotary motion of the nut and via a force transmission effectuated between the nut and the spindle in a circuit of balls of the ball screw, the piston being connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion being larger than the second portion, and including a flange which is fastenable to the hydraulic unit of the braking system, and which, on a side facing the piston assembly, includes a hollow cylindrical projection that is congruent with the opening of the hydraulic unit, in which the piston is at least partially axially displaceable with the aid of the ball screw, the hydraulic device including an opening which is designed in such a way that the piston of the pressure-generating device is at least partially axially displaceable in the opening with the aid of the ball screw;
wherein:
a length of the nut is defined along a displacement axis of the axially displaceable piston;
the first portion of the nut includes at least 50% of the length of the nut and
the second portion of the nut includes less than 50% of the length of the nut.

12. The hydraulic unit as recited in claim 11, wherein the hydraulic unit has at least one recess situated in the opening, which is designed for accommodating at least one projection formed on an outer circumferential surface of the piston in such a way that the piston is non-rotatably axially displaceable.

13. The hydraulic unit as recited in claim 12, wherein the projection is formed by a pin-shaped element, which is form-lockingly connectable to the recess.

14. A braking system for a motor vehicle, comprising:
a hydraulic unit including an opening; and
a pressure-generating device, including a piston assembly having a piston which is at least partially insertable into the opening in the hydraulic unit and is axially displaceable in the opening, and a ball screw for axially displacing the piston, the ball screw including a nut, which is configured to be set into a rotary motion with the aid of an electric motor via a gear, and including a spindle, the spindle being axially displaceable via the rotary motion of the nut and via a force transmission effectuated between the nut and the spindle in a circuit of balls of the ball screw, the piston being connected to the axially displaceable spindle of the ball screw in such a way that the piston moves along with the axially displaceable spindle of the ball screw, the piston enclosing at least one first portion of the nut in a first, retracted position of the piston and the piston enclosing at most one second portion of the nut in a second, extended position of the piston, and the first portion being larger than the second portion, and including a flange which is fastenable to the hydraulic unit of the braking system, and which, on a side facing the piston assembly, includes a hollow cylindrical projection that is congruent with the opening of the hydraulic unit, in which the piston is at least partially axially displaceable with the aid of the ball screw;
wherein:
a length of the nut is defined along a displacement axis of the axially displaceable piston;
the first portion of the nut includes at least 50% of the length of the nut and
the second portion of the nut includes less than 50% of the length of the nut.

15. A method for installing a piston assembly for a pressure-generating device of a braking system of a motor vehicle, the method comprising:
connecting the piston to a spindle of a pre-installed ball screw;
fastening the piston, together with the ball screw, to a flange of the pressure-generating device, a projection formed on the piston being accommodatable in a recess formed in the flange in such a way that the piston is non-rotatably axially displaceable; and
providing a bearing element for supporting the piston and the ball screw connected to the piston;

wherein:
the ball screw includes a nut relative to which the spindle is rotatable due to balls of the ball screw;
a length of the nut is defined along a displacement axis of the axially displaceable piston; and
the installation is performed such that in the installed state:
the piston is displaceable between (a) a fully retracted position in which the piston encloses at least 50% of the length of the nut and (b) a fully extended position in which the piston encloses at most less than 50% of the length of the nut.

16. The method as recited in claim 15, wherein a support element for preloading the piston and the ball screw connected to the piston is provided, the support element providing a stop face for the bearing element for supporting the piston and the ball screw connected to the piston.

* * * * *